Figure 1:
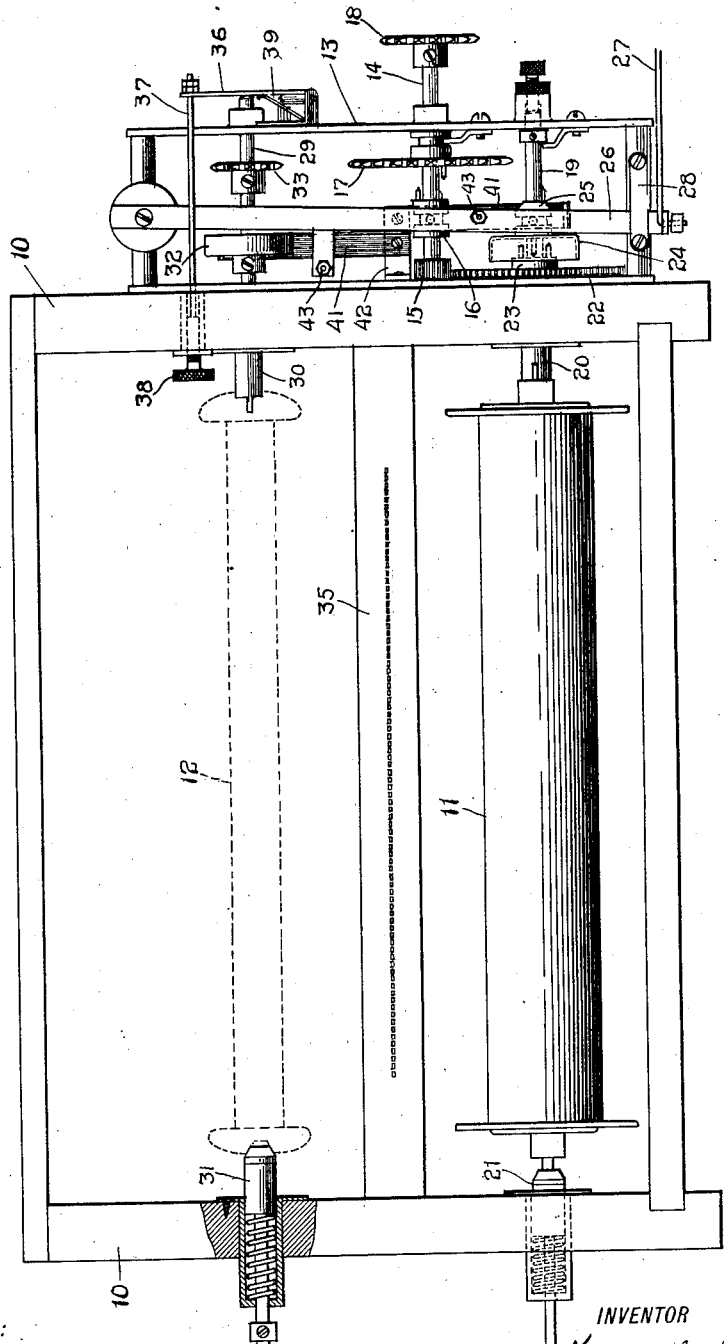

F. V. CROFUT.
TRANSMISSION FOR PLAYER PIANOS.
APPLICATION FILED OCT. 4, 1913.

1,090,386.

Patented Mar. 17, 1914.
2 SHEETS—SHEET 1.

WITNESSES:

INVENTOR
Frank V. Crofut
BY
ATTORNEY

F. V. CROFUT.
TRANSMISSION FOR PLAYER PIANOS.
APPLICATION FILED OCT. 4, 1913.
1,090,386.
Patented Mar. 17, 1914.
2 SHEETS—SHEET 2.
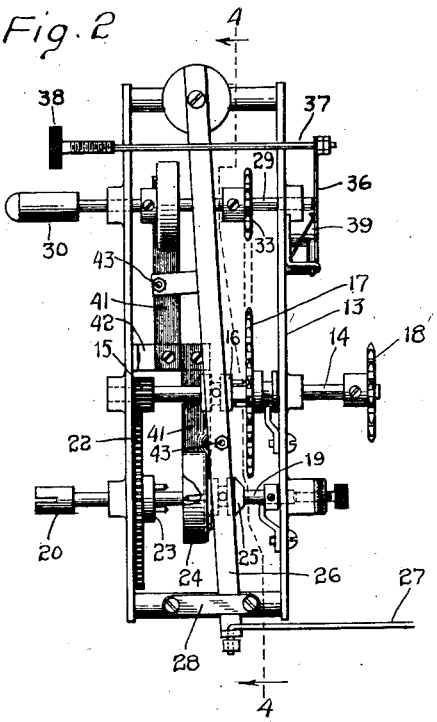
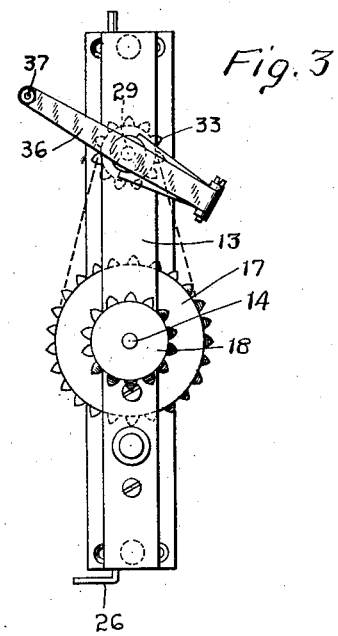
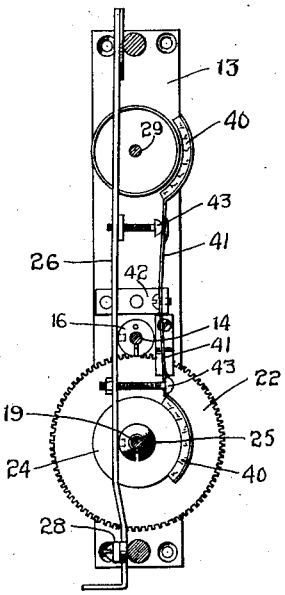
WITNESSES:
INVENTOR
Frank V. Crofut
BY
F. M. Wooster
ATTORNEY

UNITED STATES PATENT OFFICE.

FRANK V. CROFUT, OF SHELTON, CONNECTICUT.

TRANSMISSION FOR PLAYER-PIANOS.

1,090,386.  Specification of Letters Patent.  Patented Mar. 17, 1914.

Application filed October 4, 1913. Serial No. 793,392.

*To all whom it may concern:*

Be it known that I, FRANK V. CROFUT, a citizen of the United States, residing at Shelton, county of Fairfield, State of Connecticut, have invented an Improvement in Transmissions for Player - Pianos, of which the following is a specification.

This invention has for its object to provide a simple, inexpensive and durable transmission for player-pianos in which the number of parts shall be reduced to the minimum, in which the parts may be readily assembled and in which longitudinal movement of the driving shaft or of a driving pinion thereon shall be avoided.

With these and other objects in view I have devised the simple and novel transmission which I will now describe, referring to the accompanying drawings forming a part of this specification and using reference characters to indicate the several parts.

Figure 1 is an elevation of the spool box and transmission of a player-piano, the parts of the transmission being in the normal or taking-up position; Fig. 2 an elevation of the transmission detached, the parts being in the re-winding position; Fig. 3 an elevation as seen from the right in Fig. 2, and Fig. 4 is a section on the line 4—4 in Fig. 2, looking in the direction of the arrows.

10 denotes the spool box of a player-piano, 11 the take-up spool, and 12 (appearing in dotted lines only) the spool of a roll of music. The transmission is carried by a frame 13 secured to the end of the spool box.

14 denotes the driving shaft which is journaled in the frame and carries a driving pinion 15 fixed to the shaft, a hub 16 keyed to the shaft but adapted to slide longitudinally thereon and having one or more laterally projecting pins, a sprocket wheel 17 fixed to the shaft and provided with one or more pins for engagement by the pins on the hub, and a fixed sprocket wheel 18 from which a sprocket chain, not shown, extends to a motor, not shown.

19 denotes the take-up shaft which is journaled in the frame and the spool box and is provided at its inner end with a socket 20 which is detachably engaged by a hub at one end of the take-up spool, a hub at the other end of the take-up spool engaging a longitudinally sliding spring-controlled socket 21 in the other end of the spool box. Shaft 19 carries a gear wheel 22, loose on the shaft but retained against longitudinal movement thereon, and having a hub 23 provided with one or more laterally projecting pins adapted to be engaged by corresponding pins on a friction wheel 24 which is keyed to the shaft but adapted to slide longitudinally thereon. The hub 25 of the friction wheel is provided with a groove engaged by a pin carried by a lever 26 pivoted at the upper end of the frame. This lever is operated by means of a swinging rod 27, the movement of the lever in each direction being limited by a guide 28.

29 denotes the re-winding shaft which is journaled in the frame and the spool box and is provided at its inner end with a hub 30 which is detachably engaged by the music roll spool (see dotted lines, Fig. 1) the other end of the music roll spool engaging a longitudinally movable spring-controlled hub 31 in the other end of the spool box. Shaft 29 carries a fixed friction wheel 32 and a fixed sprocket wheel 33 which is connected by means of a sprocket chain, see dotted lines Figs. 2 and 3, with sprocket wheel 17 on the driving shaft. The re-winding shaft is adjustable longitudinally to cause the perforations in a music roll to register with the openings in the tracker bar, indicated by 35, by means of a hinged arm 36 which bears against the end of the shaft and is controlled by a rod 37 which extends through the spool box and is provided at its inner end with a knob 38 having a threaded shank engaging a nut in the spool box. A spring 39 may be provided, as shown, to normally swing the arm outward.

The friction wheels on the take-up shaft and the re-winding shaft are engaged by friction pads 40 carried by spring arms 41 extending from a bracket 42 secured to the frame. The pads are alternately lifted out of engagement with the friction wheels by means of studs 43 carried by lever 26 and having rounded heads which engage the spring arms, the latter being provided with inclined depressions which are engaged by the heads of the studs to swing the arms outward.

The operation is as follows: The driving shaft rotates continuously and drives gear wheel 22 on the take-up shaft continuously. Movement of lever 26 toward the left will cause the pins on friction wheel 24 to engage the pins on the hub of the gear wheel, which will cause the gear wheel to impart rotation to the take-up shaft and take-up spool. Movement of the lever toward the right will disengage the friction wheel from the gear wheel and will cause the pin or pins on sliding hub 16 to engage the corresponding pin or pins on sprocket wheel 17 on the driving shaft, thus stopping the rotation of the take-up spool and causing the sprocket wheel and chain to impart rotation to the re-winding shaft and the music roll spool carried thereby. The friction pads coöperate with the friction wheels to stop the rotation of the take-up shaft when connection is made with the re-winding shaft, and rotation of the winding shaft when connection is made with the take-up shaft.

Having thus described my invention I claim:

1. In a mechanism of the character described, the combination with the driving shaft, of a take-up shaft and re-winding shaft, of loose wheels on the driving and take-up shafts which are retained against longitudinal movement, a friction wheel fixed to the re-winding shaft, a sliding hub keyed to the driving shaft, a sliding friction wheel keyed to the take-up shaft, said sliding members being provided with means for engaging the corresponding loose wheels, driving connection between the driving shaft and re-winding shaft, a lever pivoted at one end, connections between the lever and sliding members for shifting both the sliding members, curved friction pads normally engaging the periphery of the friction wheels, spring arms by which said pads are carried, and studs carried by the lever and engaging the spring arms to move the friction pads out of engagement with the friction wheels.

2. In a mechanism of the character described, the combination with the driving shaft, of a take-up shaft and re-winding shaft, of loose wheels on the driving and take-up shafts which are retained against longitudinal movement, a friction wheel fixed to the re-winding shaft, a sliding hub keyed to the driving shaft, a sliding friction wheel keyed to the take-up shaft, said sliding members being provided with means for engaging the corresponding loose wheels, driving connection between the driving shaft and re-winding shaft, a lever pivoted at one end, connections between the lever and sliding members for shifting both the sliding members, curved friction pads normally engaging the periphery of the friction wheels, spring arms by which said pads are carried having their fixed ends secured between the take-up and re-winding shafts and studs carried at intermediate points upon the lever and engaging the spring arms to move the friction pads out of the engagement with the friction wheels.

3. In a mechanism of the character described, the combination of a driving shaft, a take-up shaft and re-winding shaft, of loose wheels on the driving and take-up shafts, sliding members keyed to the driving and take-up shafts and provided with means for engagement with loose wheels, a driving connection from the driving shaft to the re-winding shaft, means for shifting the sliding members, a hinged arm bearing against the end of the re-winding shaft and means for operating said arm to adjust said shaft longitudinally.

In testimony whereof I affix my signature in presence of two witnesses.

FRANK V. CROFUT.

Witnesses:
JOHN T. BREWSTER,
C. F. MURPHY.

---

Copies of this patent may be obtained for five cents each, by addressing the "Commissioner of Patents, Washington, D. C."